(12) United States Patent
Awoniyi-Oteri et al.

(10) Patent No.: US 11,627,598 B2
(45) Date of Patent: Apr. 11, 2023

(54) MASK-BASED CONFIGURATION FOR DISCONTINUOUS RECEPTION

(71) Applicant: QUALCOMM Incorporated, San Diego, CA (US)

(72) Inventors: Olufunmilola Omolade Awoniyi-Oteri, San Diego, CA (US); Jelena Damnjanovic, Del Mar, CA (US); Tao Luo, San Diego, CA (US); Linhai He, San Diego, CA (US); Ozcan Ozturk, San Diego, CA (US); Yan Zhou, San Diego, CA (US); Iyab Issam Sakhnini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 212 days.

(21) Appl. No.: 17/202,758

(22) Filed: Mar. 16, 2021

(65) Prior Publication Data

US 2021/0298065 A1    Sep. 23, 2021

Related U.S. Application Data

(60) Provisional application No. 62/992,652, filed on Mar. 20, 2020.

(51) Int. Cl.
*H04W 72/14* (2009.01)
*H04L 1/00* (2006.01)
*H04W 76/28* (2018.01)

(52) U.S. Cl.
CPC .......... *H04W 72/14* (2013.01); *H04L 1/0003* (2013.01); *H04W 76/28* (2018.02)

(58) Field of Classification Search
CPC . H04W 72/14; H04W 76/28; H04W 52/0216; H04L 1/0003; Y02D 30/70
See application file for complete search history.

(56) References Cited

U.S. PATENT DOCUMENTS

| 2019/0124594 | A1* | 4/2019 | Wang | H04J 11/00 |
| 2019/0207737 | A1* | 7/2019 | Babaei | H04W 76/11 |
| 2020/0396684 | A1* | 12/2020 | Lin | H04W 52/0216 |
| 2021/0084586 | A1* | 3/2021 | Loehr | H04W 52/0229 |

OTHER PUBLICATIONS

International Search Report and Written Opinion—PCT/US2021/022740—ISA/EPO—dated Jul. 12, 2021.

* cited by examiner

*Primary Examiner* — Walli Z Butt
(74) *Attorney, Agent, or Firm* — Harrity & Harrity, LLP

(57) ABSTRACT

Various aspects of the present disclosure generally relate to wireless communication. In some aspects, a user equipment may receive a first configuration and a second configuration, wherein the first configuration is for a discontinuous reception (DRX) cycle and the second configuration is for a configured grant (CG), wherein the DRX cycle is associated with a set of active time durations and a set of non-active time durations, and wherein the CG is associated with a transmission in one or more non-active time durations of the set of non-active time durations; receive information identifying a mask, wherein the mask indicates a modified configuration for the transmission in the one or more non-active time durations or a modified multiplexing scheme for the CG; and selectively perform or skip the transmission in accordance with the CG and the mask. Numerous other aspects are provided.

30 Claims, 7 Drawing Sheets

MASK-BASED CONFIGURATION FOR DISCONTINUOUS RECEPTION

CROSS-REFERENCE TO RELATED APPLICATION

This patent Applications claims priority to U.S. Provisional Patent Application No. 62/992,652, filed on Mar. 20, 2020, entitled "MASK-BASED CONFIGURATION FOR DISCONTINUOUS RECEPTION," and assigned to the assignee hereof. The disclosure of the prior Applications is considered part of and is incorporated by reference into this patent Applications.

FIELD OF THE DISCLOSURE

Aspects of the present disclosure generally relate to wireless communication and to techniques and apparatuses for mask-based configuration for discontinuous reception.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a user equipment (UE), may include receiving a first configuration and a second configuration, wherein the first configuration is for a discontinuous reception (DRX) cycle and the second configuration is for a configured grant (CG), wherein the DRX cycle is associated with a set of active time durations and a set of non-active time durations, and wherein the CG is associated with a transmission in one or more non-active time durations of the set of non-active time durations; receiving information identifying a mask, wherein the mask indicates a modified configuration for the transmission in the one or more non-active time durations or a modified multiplexing scheme for the CG; and selectively performing or skipping the transmission in accordance with the CG and the mask.

In some aspects, a method of wireless communication, performed by a base station, may include transmitting, to a UE, a first configuration and a second configuration, wherein the first configuration is for a DRX cycle and the second configuration is for a CG, wherein the DRX cycle is associated with a set of active time durations and a set of non-active time durations, and wherein the CG is associated with a transmission in one or more non-active time durations of the set of non-active time durations; transmitting information identifying a mask, wherein the mask indicates a modified configuration for the transmission in the one or more non-active time durations or a modified multiplexing scheme for the CG; and selectively receiving or skipping reception of the transmission in accordance with the CG and the mask.

In some aspects, a UE for wireless communication may include a memory and one or more processors operatively coupled to the memory. The memory and the one or more processors may be configured to receive a first configuration and a second configuration, wherein the first configuration is for a DRX cycle and the second configuration is for a CG, wherein the DRX cycle is associated with a set of active time durations and a set of non-active time durations, and wherein the CG is associated with a transmission in one or more non-active time durations of the set of non-active time durations; receive information identifying a mask, wherein the mask indicates a modified configuration for the transmission in the one or more non-active time durations or a modified multiplexing scheme for the CG; and selectively perform or skip the transmission in accordance with the CG and the mask.

In some aspects, a base station for wireless communication may include a memory and one or more processors operatively coupled to the memory. The memory and the one or more processors may be configured to transmit, to a UE, a first configuration and a second configuration, wherein the first configuration is for a DRX cycle and the second configuration is for a CG, wherein the DRX cycle is associated with a set of active time durations and a set of non-active time durations, and wherein the CG is associated with a transmission in one or more non-active time durations of the set of non-active time durations; transmit information identifying a mask, wherein the mask indicates a modified configuration for the transmission in the one or more non-active time durations or a modified multiplexing scheme for the CG; and selectively receive or skip reception of the transmission in accordance with the CG and the mask.

In some aspects, a non-transitory computer-readable medium may store one or more instructions for wireless communication. The one or more instructions, when executed by one or more processors of a UE, may cause the one or more processors to receive a first configuration and a second configuration, wherein the first configuration is for a DRX cycle and the second configuration is for a CG, wherein the DRX cycle is associated with a set of active time durations and a set of non-active time durations, and wherein the CG is associated with a transmission in one or more non-active time durations of the set of non-active time durations; receive information identifying a mask, wherein the mask indicates a modified configuration for the transmission in the one or more non-active time durations or a modified multiplexing scheme for the CG; and selectively perform or skip the transmission in accordance with the CG and the mask.

In some aspects, a non-transitory computer-readable medium may store one or more instructions for wireless communication. The one or more instructions, when executed by one or more processors of a base station, may cause the one or more processors to transmit, to a UE, a first configuration and a second configuration, wherein the first configuration is for a DRX cycle and the second configuration is for a CG, wherein the DRX cycle is associated with a set of active time durations and a set of non-active time durations, and wherein the CG is associated with a transmission in one or more non-active time durations of the set of non-active time durations; transmit information identifying a mask, wherein the mask indicates a modified configuration for the transmission in the one or more non-active time durations or a modified multiplexing scheme for the CG; and selectively receive or skip reception of the transmission in accordance with the CG and the mask.

In some aspects, an apparatus for wireless communication may include means for receiving a first configuration and a second configuration, wherein the first configuration is for a DRX cycle and the second configuration is for a CG, wherein the DRX cycle is associated with a set of active time durations and a set of non-active time durations, and wherein the CG is associated with a transmission in one or more non-active time durations of the set of non-active time durations; means for receiving information identifying a mask, wherein the mask indicates a modified configuration for the transmission in the one or more non-active time durations or a modified multiplexing scheme for the CG; and means for selectively performing or skipping the transmission in accordance with the CG and the mask.

In some aspects, an apparatus for wireless communication may include means for transmitting, to a UE, a first configuration and a second configuration, wherein the first configuration is for a DRX cycle and the second configuration is for a CG, wherein the DRX cycle is associated with a set of active time durations and a set of non-active time durations, and wherein the CG is associated with a transmission in one or more non-active time durations of the set of non-active time durations; means for transmitting information identifying a mask, wherein the mask indicates a modified configuration for the transmission in the one or more non-active time durations or a modified multiplexing scheme for the CG; and means for selectively receiving or skipping reception of the transmission in accordance with the CG and the mask.

Aspects generally include a method, apparatus, system, computer program product, non-transitory computer-readable medium, user equipment, base station, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
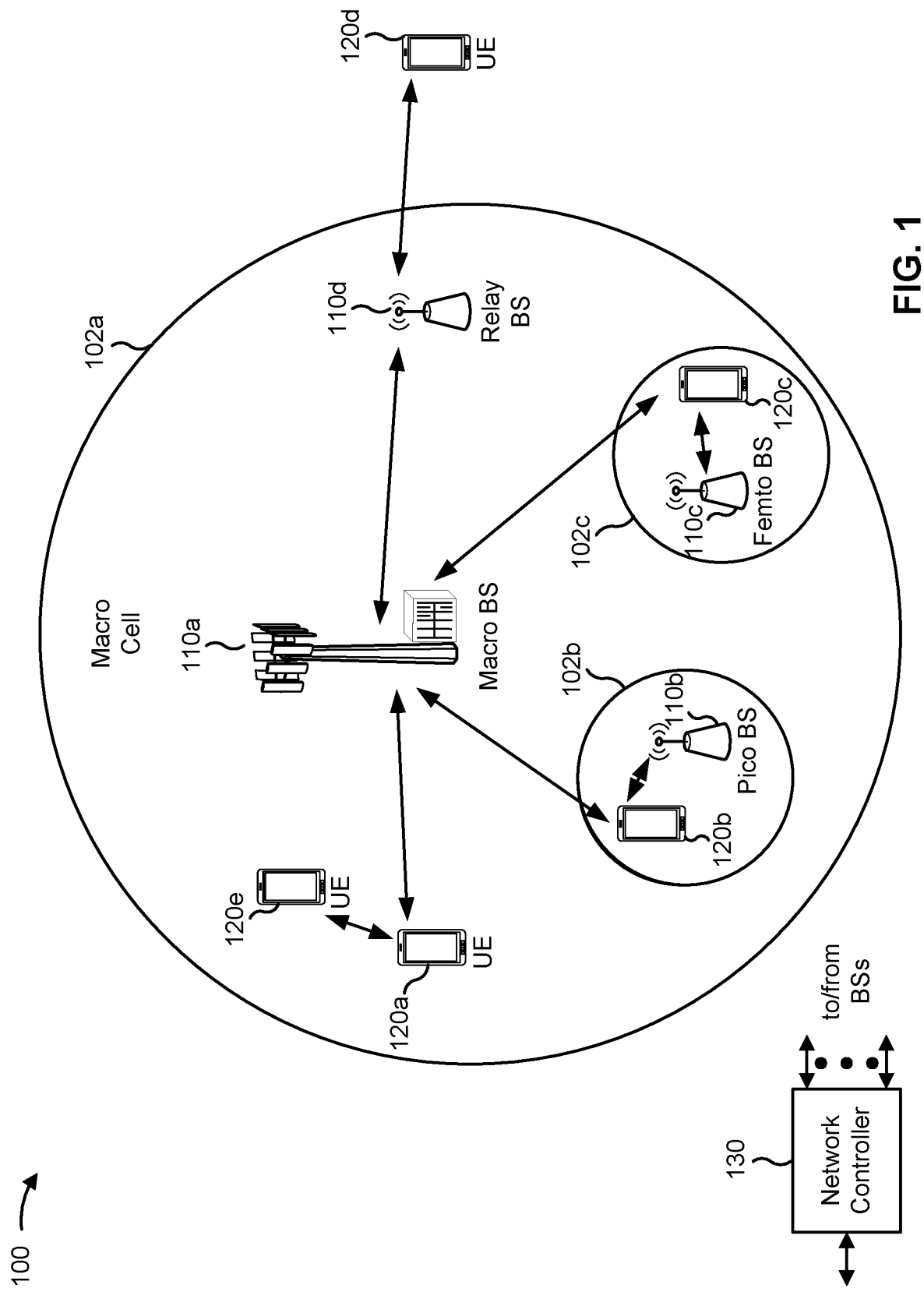
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
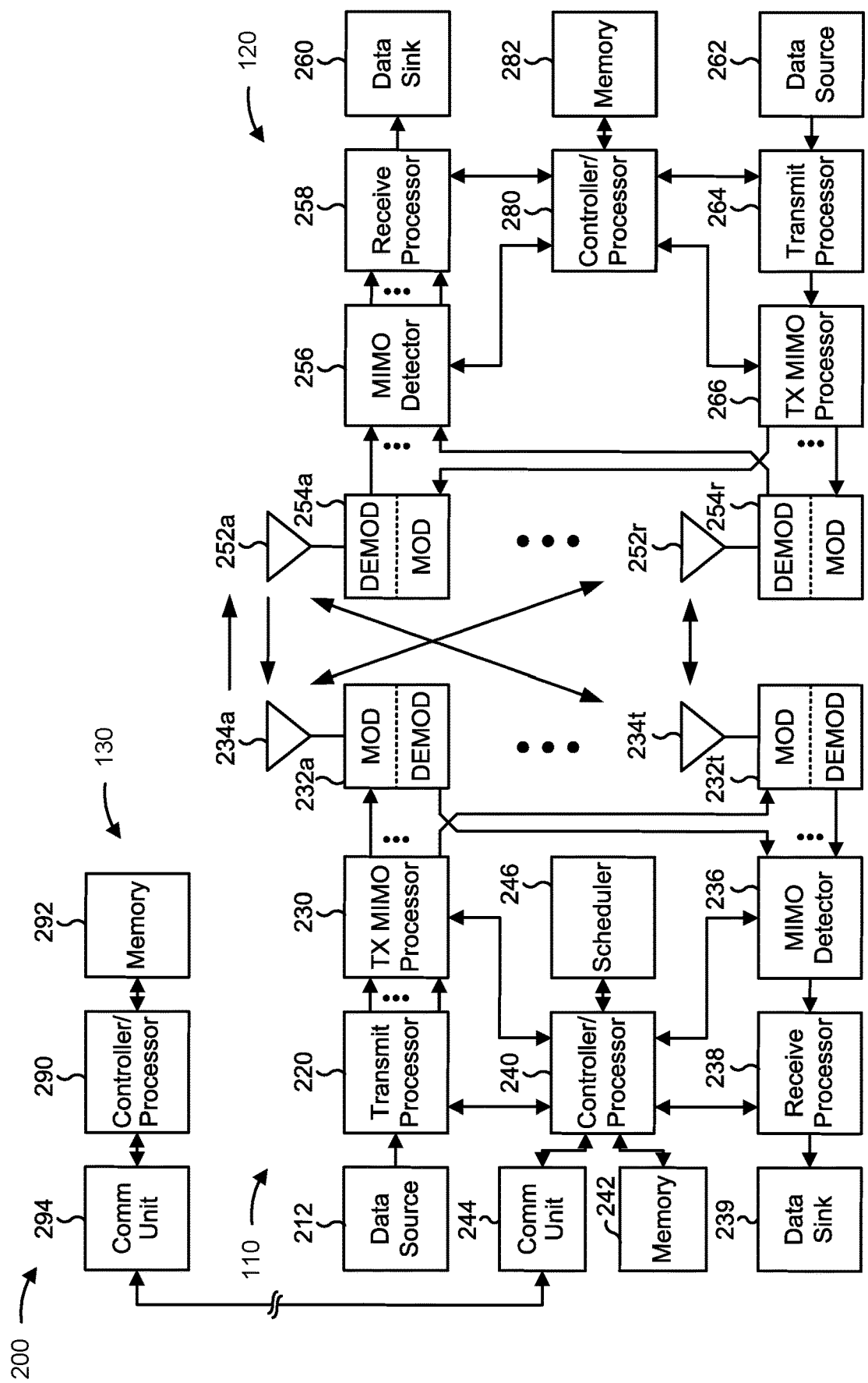
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor"

may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234*a* through 234*t* and/or antennas 252*a* through 252*r*) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 3-8).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 3-8).

Controller/processor 240 of base station 110, controller/processor 280 of UE 120, and/or any other component(s) of FIG. 2 may perform one or more techniques associated with a mask-based configuration for discontinuous reception (DRX), as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some aspects, executing instructions may include running the instructions, converting the instructions, compiling the instructions, and/or interpreting the instructions, among other examples.

In some aspects, UE 120 may include means for receiving a first configuration and a second configuration, wherein the first configuration is for a DRX cycle and the second configuration is for a configured grant (CG); means for receiving information identifying a mask, wherein the mask indicates a modified configuration for the transmission in the one or more non-active time durations or a modified multiplexing scheme for the CG; means for selectively performing or skipping the transmission in accordance with the CG and the mask; means for receiving information activating or deactivating the mask, wherein selectively performing or skipping the transmission in accordance with the CG and the mask is based at least in part on the information activating or deactivating the mask; means for transmitting a request for the information identifying the mask, wherein the information identifying the mask is received based at least in part on the request; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for transmitting, to a UE, a first configuration and a second configuration, wherein the first configuration is for a DRX cycle and the second configuration is for a CG; means for transmitting information identifying a mask, wherein the mask indicates a modified configuration for the transmission in the one or more non-active time durations or a modified multiplexing scheme for the CG; means for selectively receiving or skipping reception of the transmission in accordance with the CG and the mask; means for transmitting information activating or deactivating the mask, wherein selectively receiving or skipping reception of the transmission in accordance with the CG and the mask is based at least in part on the information activating or deactivating the mask; means for receiving a request for the information identifying the mask, wherein the information identifying the mask is transmitted based at least in part on the request; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
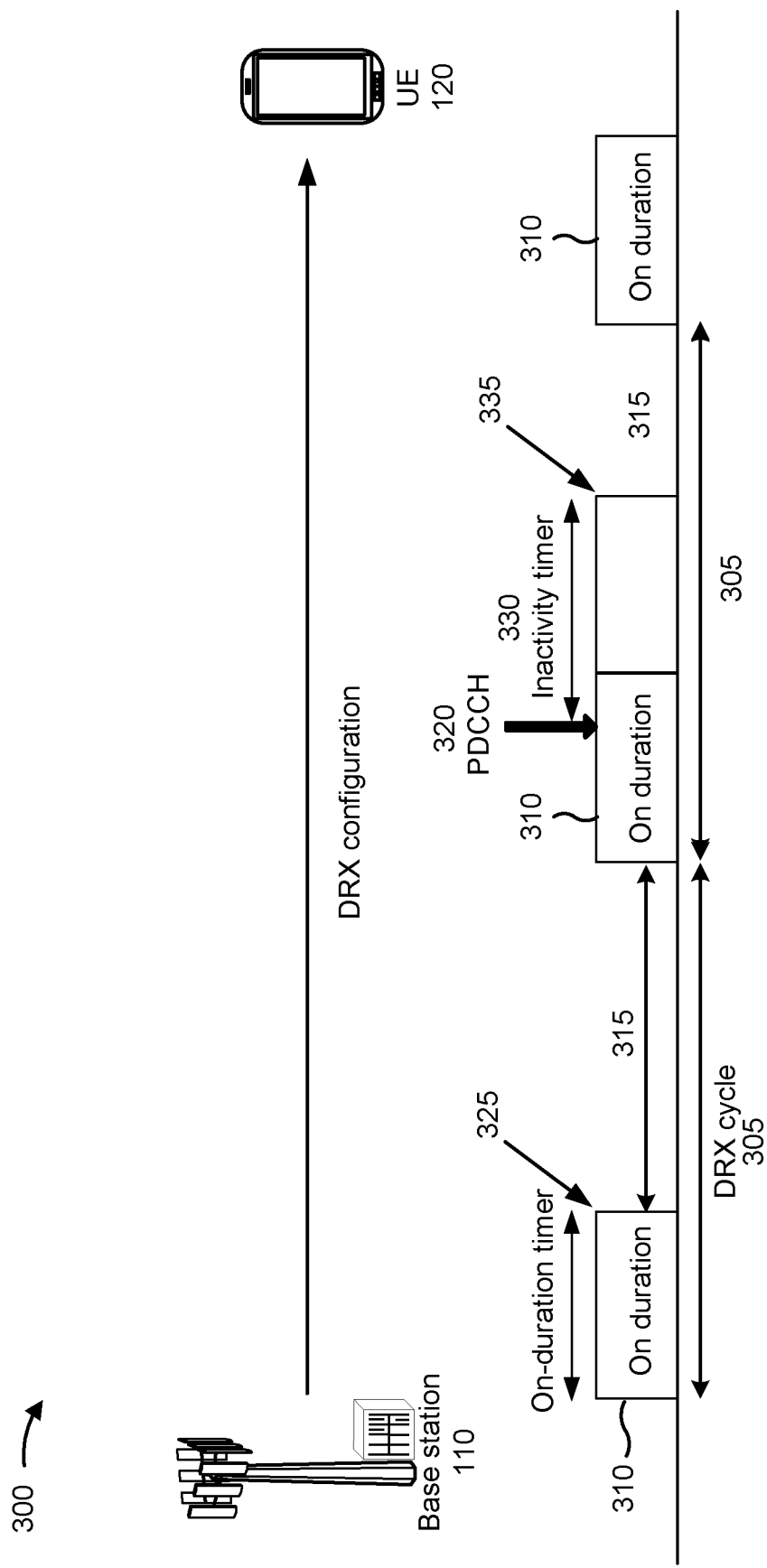
FIG. 3 is a diagram illustrating an example of a discontinuous reception (DRX) configuration, in accordance with the present disclosure.

FIG. 3 is a diagram illustrating an example 300 of a discontinuous reception (DRX) configuration, in accordance with the present disclosure.

As shown in FIG. 3, a base station 110 may transmit a DRX configuration to a UE 120 to configure a DRX cycle 305 for the UE 120. A DRX cycle 305 may include a DRX on duration 310 (e.g., during which a UE 120 is awake or in an active state) and an opportunity to enter a DRX sleep state 315. As used herein, the time during which the UE 120 is configured to be in an active state during the DRX on duration 310 may be referred to as an active time or active time duration, and the time during which the UE 120 is configured to be in the DRX sleep state 315 may be referred to as an inactive time or a non-active time duration. As described below, the UE 120 may monitor a physical downlink control channel (PDCCH) during the active time, and may refrain from monitoring the PDCCH during the inactive time.

During the DRX on duration 310 (e.g., the active time), the UE 120 may monitor a downlink control channel (e.g., a PDCCH), as shown by reference number 320. For example, the UE 120 may monitor the PDCCH for downlink control information (DCI) pertaining to the UE 120. If the UE 120 does not detect and/or successfully decode any PDCCH communications intended for the UE 120 during the DRX on duration 310, then the UE 120 may enter the sleep state 315 (e.g., for the inactive time) at the end of the DRX on duration 310, as shown by reference number 325. In this way, the UE 120 may conserve battery power and reduce power consumption. As shown, the DRX cycle 305 may repeat with a configured periodicity according to the DRX configuration.

If the UE 120 detects and/or successfully decodes a PDCCH communication intended for the UE 120, then the UE 120 may remain in an active state (e.g., awake) for the duration of a DRX inactivity timer 330 (e.g., which may extend the active time). The UE 120 may start the DRX inactivity timer 330 at a time at which the PDCCH communication is received (e.g., in a transmission time interval (TTI) in which the PDCCH communication is received, such as a slot, a subframe, and/or the like). The UE 120 may remain in the active state until the DRX inactivity timer 330 expires, at which time the UE 120 may enter the sleep state 315 (e.g., for the inactive time), as shown by reference number 335. During the duration of the DRX inactivity timer 330, the UE 120 may continue to monitor for PDCCH communications, may obtain a downlink data communication (e.g., on a downlink data channel, such as a physical downlink shared channel (PDSCH)) scheduled by the PDCCH communication, may prepare and/or transmit an uplink communication (e.g., on a physical uplink shared channel (PUSCH)) scheduled by the PDCCH communication, may transmit an uplink communication in accordance with a CG identified by the PDCCH, and/or the like. The UE 120 may restart the DRX inactivity timer 330 after each detection of a PDCCH communication for the UE 120 for an initial transmission (e.g., but not for a retransmission). By operating in this manner, the UE 120 may conserve battery power and reduce power consumption by entering the sleep state 315.

In some aspects, the PDCCH communication may schedule an uplink transmission based at least in part on a CG. For example, the CG may indicate resources for a periodic transmission by the UE 120. In some cases, these resources may occur during a sleep state 315 of the UE 120. Furthermore, the inactivity timer may not be reset for a CG transmission, and a retransmission timer and/or a hybrid automatic repeat request (HARQ) timer for an uplink assignment for HARQ retransmission may be triggered whether a CG transmission is in an on duration or an off duration of the DRX cycle. This may mean that the UE 120 cannot maximize the sleep opportunity, or may be unable to enter a deep sleep state due to a shortened inactive time, which may consume power of the UE 120. Techniques and apparatuses described herein provide a mask-based approach for disallowing transmissions in a non-active time of the UE 120, as described below.

As indicated above, FIG. 3 is provided as an example. Other examples may differ from what is described with respect to FIG. 3.

A UE may use a DRX cycle to conserve power. In some cases, a network may configure a grant (referred to herein as a configured grant (CG)) for periodic data to be transmitted on the uplink by a UE. A configured grant identifies recurring resources for period transmission of data by the UE. A CG may reduce control overhead relative to performing one-off scheduling for each transmission of periodic data, and may improve predictability of traffic patterns. In a first type of CG (CG Type 1), parameters of the CG may be configured using radio resource control (RRC) signaling, and the CG may be activated via RRC signaling. In a second type of CG (CG Type 2), a periodicity of the CG may be configured via RRC signaling, the CG may be activated using a PDCCH, and parameter configuration and acknowledgment of the activation signal may be performed using medium access control (MAC) signaling. If the UE is configured with a CG and the UE does not have data to transmit, the UE may not transmit data on the CG.

Due to the CG and the DRX cycle configuration of the UE, the UE may be configured with a CG resource that overlaps with a non-active time of the UE. This may mean that the UE cannot maximize a sleep opportunity because the UE stays awake to transmit data on the CG resource that overlaps the non-active time. If the UE does sleep, then the UE may not be able to enter a deep sleep mode due to a short non-active time, thus using battery power of the UE. Furthermore, while the UE can elect not to use a CG resource if the UE does not have data to transmit on the CG resource, an unused CG resource may be associated with some resource overhead if the base station is unaware that the CG resource will be unused, since the base station may reserve the CG resource for the UE's use.

Some techniques and apparatuses described herein provide a network-configured mask for a DRX cycle of a UE configured with a CG. In some aspects, the mask indicates time periods, corresponding to non-active time durations of the DRX cycle, in which CG transmissions by the UE are disallowed. Thus, the base station may configure the UE not to transmit in the non-active time durations of the DRX cycle, thereby reducing power consumption of the UE and reducing resource overhead associated with unused CG resources. In some aspects, the mask indicates time periods in which transmissions such as uplink control information (UCI), measurement information (e.g., an aperiodic channel state information (CSI) report or a periodic CSI report), signals (e.g., an aperiodic sounding reference signal (SRS)), or the like can be multiplexed on unused CGs. Multiplexing such transmissions on an unused CG may conserve uplink resources that would otherwise be used to transmit on a dedicated resource while the unused CG is not utilized.

Figure 4:
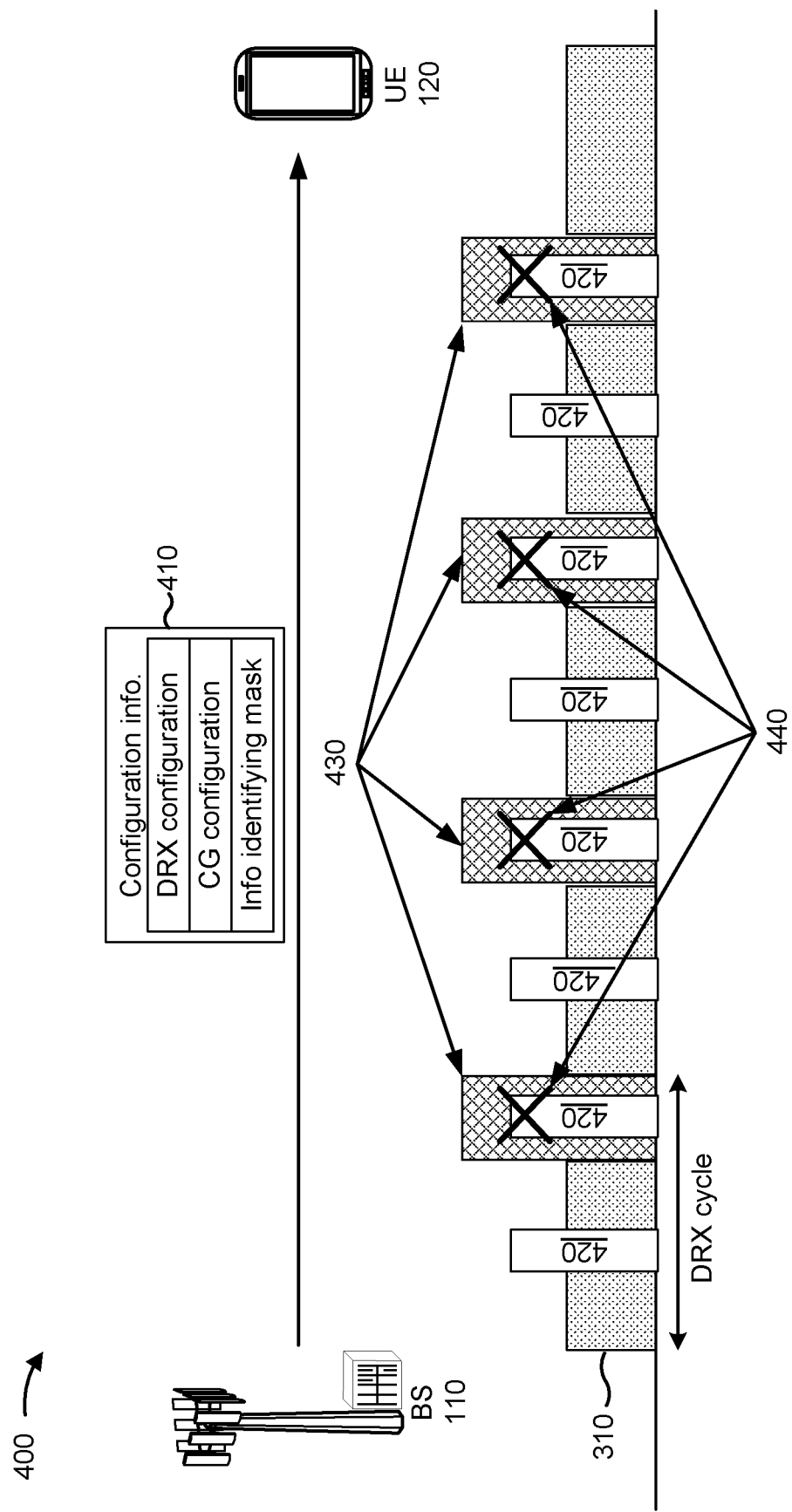
FIG. 4 is a diagram illustrating an example of configuration and utilization of a mask for a DRX cycle, in accordance with the present disclosure.

FIG. 4 is a diagram illustrating an example 400 of configuration and utilization of a mask for a DRX cycle, in accordance with the present disclosure. As shown, example 400 includes a UE 120 and a BS 110.

As shown by reference number 410, the BS 110 may provide configuration information to the UE 120. As shown, in example 400, the configuration information indicates a DRX configuration, a CG configuration, and information identifying a mask. In some aspects, each of the DRX configuration, the CG configuration, and information identifying the mask may be provided separately from each other (e.g., in separate messages, in separate parts of a message, or at separate stages of connection establishment and maintenance). In some aspects, two or more of the DRX configuration, the CG configuration, and information identifying the mask may be provided together, such as in a same message, a same part of a message, or at the same stage of connection establishment and maintenance. In some aspects, one or more of the DRX configuration and the CG configuration may be provided via RRC signaling. In some aspects, at least part of the CG configuration may be provided via MAC signaling or DCI, such as an activation of the CG configuration.

In some aspects, the configuration information may indicate a DRX configuration. A DRX configuration is sometimes referred to herein as a first configuration. In some aspects, the DRX configuration may be provided in connection with an RRC reconfiguration or the like. The DRX configuration may indicate, for example, an on duration timer, an inactivity timer, a retransmission timer, a cycle start offset, a cycle length, or the like.

In some aspects, the configuration information may indicate a CG configuration. The CG configuration is sometimes referred to herein as a second configuration. For example, the configuration information may include information configuring resources for a CG (sometimes referred to as a configured uplink grant), information activating a CG, and/or or the like. CG resources associated with the CG configuration are shown by reference number 420. The CG resources may be resources, configured for the UE 120, that can be used by the UE 120 for an uplink transmission. The CG resources may be time and/or frequency resources. As further shown, if the CG configuration is applied without the mask, then some CG resources occur in a non-active time duration of the DRX cycle.

As further shown, the configuration information includes information identifying a mask. For example, the information identifying the mask may identify a set of time windows 430 (e.g., in example 400, the mask may identify or be the set of time windows 430). The set of time windows 430 may correspond to (e.g., occur in) one or more non-active time durations of the DRX cycle. In a time window 430, the UE 120 may be disallowed from utilizing a CG resource 420 for an uplink transmission, as indicated by an "X" shown by reference number 440 on the corresponding CG resource 420. For example, the UE 120 may be disallowed from performing an uplink transmission on the CG resource 420. Thus, the BS 110 may configure the UE 120 to skip CG transmissions during the non-active time duration, thereby allowing the UE 120 to enter a sleep mode (e.g., a deep sleep mode) in the non-active time duration. Furthermore, the BS 110 may utilize the CG resources in the UE 120's non-active time duration for communications of other UEs (e.g., the BS 110 may schedule a resource in the non-active time for another UE), thereby improving resource utilization relative to the UE 120 determining, without the BS 110's knowledge, that the UE 120 is not to use a CG resource.

The information identifying the mask may be provided using physical-layer signaling (e.g., DCI), MAC signaling (e.g., a MAC control element (MAC-CE)), RRC signaling, a combination thereof, and/or the like. In some aspects, a time window 430 may be defined relative to a non-active time duration of the UE 120. For example, the information identifying the mask may indicate a set of non-active time durations in which the mask applies (e.g., the mask may apply to a non-active time duration in every Nth DRX cycle for the next M DRX cycles). In some aspects, the mask may be activated or deactivated. For example, the mask may be configured via higher layer signaling (e.g., RRC signaling), and the UE 120 may receive signaling (e.g., DCI, a MAC-CE, RRC signaling) from the BS 110 indicating that the mask is activated. The UE 120 may apply the mask in every Nth DRX cycle until the UE 120 receives signaling indicating that the mask is deactivated. In some aspects, the mask may be defined based at least in part on a reference time frame. For example, the mask may be applied in time windows that are defined relative to a frame timing of the UE 120 and/or the like.

In some aspects, the UE 120 may receive the information identifying the mask based at least in part on a request. For example, the UE 120 may transmit a request for the information identifying the mask (not shown in FIG. 4). The BS 110 may receive the request and may provide the information identifying the mask in accordance with the request. For example, the BS 110 may accept the request and/or provide a confirmation regarding the request.

As indicated above, FIG. 4 is provided as an example. Other examples may differ from what is described with respect to FIG. 4.

Figure 5:
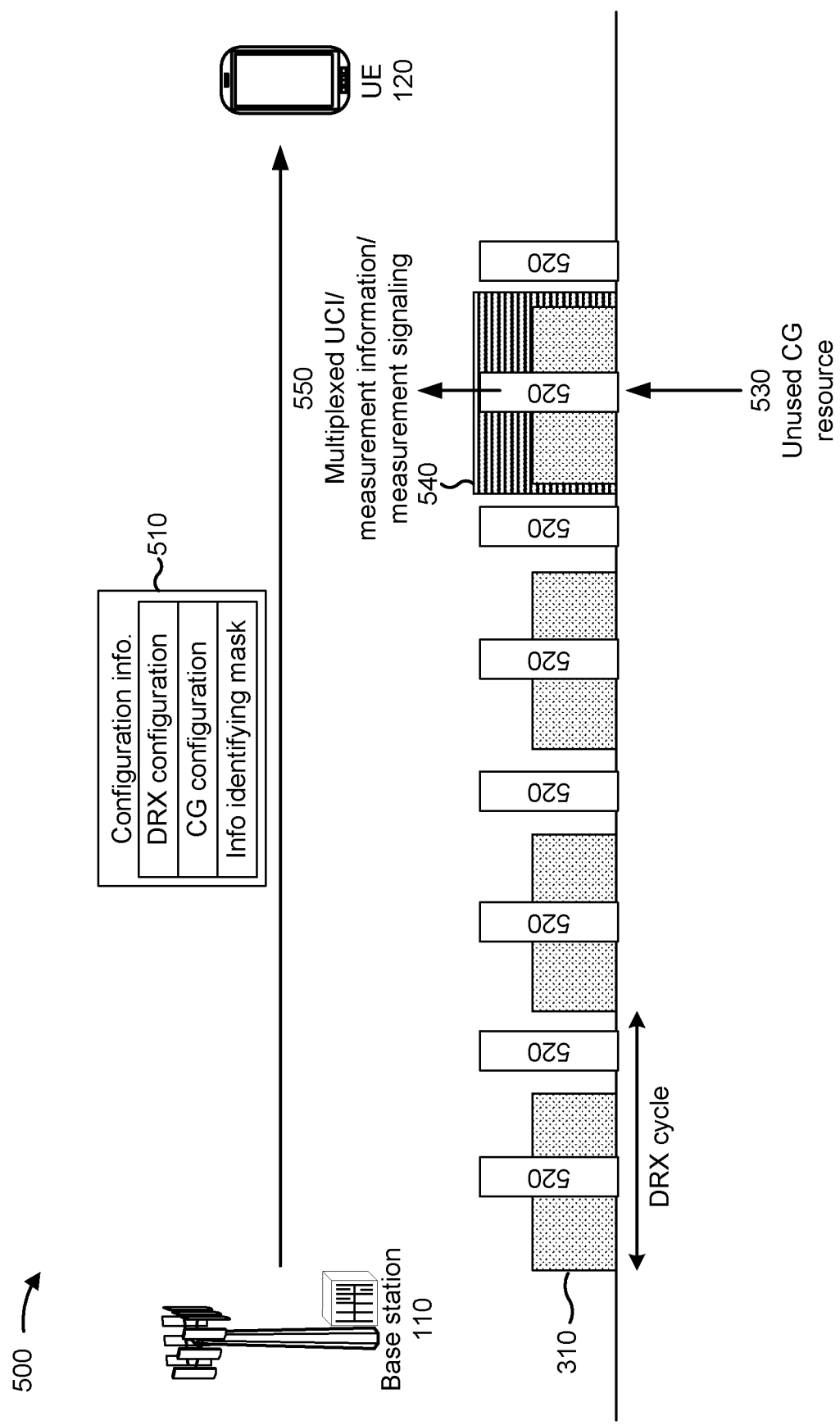
FIG. 5 is a diagram illustrating an example of configuration and utilization of a mask for a DRX cycle, in accordance with the present disclosure.

FIG. 5 is a diagram illustrating an example 500 of configuration and utilization of a mask for a DRX cycle, in accordance with the present disclosure. As shown, example 500 includes a UE 120 and a BS 110.

As shown by reference number 510, the BS 110 may provide configuration information to the UE 120. In some aspects, the configuration information may indicate a DRX configuration and a CG configuration, as described in connection with FIG. 4. The CG configuration may identify CG resources 520. In some aspects, a CG resource may be unused (e.g., for a transmission by the UE 120 associated with the CG), as shown by reference number 530.

As further shown, the configuration information includes information identifying a mask. The mask may identify or be a set of time windows 540 in which UCI, measurement information, or signaling can be multiplexed or transmitted on an unused CG resource. Thus, the mask may identify a set of time windows 540 in which a modified multiplexing scheme can be used. For example, in some deployments, UCI, measurement information, or signaling may be disallowed from being transmitted on an unused CG resource, which involves the utilization of uplink resources other than the unused CG resource, thereby decreasing efficiency of resource utilization in such deployments. By enabling the usage of the modified multiplexing scheme for unused CG resources, resource utilization of the UE 120 is improved.

As shown by reference number 550, the UE 120 may transmit UCI, measurement information, and/or measurement signaling on the unused CG resource. For example, the UCI, measurement information, and/or measurement signaling may be transmitted using the CG resource, and/or may be multiplexed on the CG resource (e.g., with other information transmitted using the CG resource). In this way, the UE 120 may improve utilization of uplink resources for transmission of UCI, measurement information, and/or measurement signals.

The information identifying the mask may be provided using physical-layer signaling (e.g., DCI), MAC signaling (e.g., a MAC CE), RRC signaling, and/or the like. In some aspects, a time window 540 may be defined relative to an active time duration and/or a non-active time duration of the UE 120. For example, the information identifying the mask may indicate a set of active time durations and/or non-active time durations in which the mask applies (e.g., the mask may apply to an active time duration and/or a non-active time duration in every Nth DRX cycle for the next M DRX cycles, where M and N are integers). In some aspects, the mask may be activated or deactivated. For example, the UE 120 may receive information configuring the mask (e.g., RRC signaling or the like), and may receive signaling from the BS 110 indicating that the mask is activated (e.g., DCI, a MAC-CE, RRC signaling, or the like). The UE 120 may apply the mask in every Nth DRX cycle until the UE 120 receives signaling indicating that the mask is deactivated. In some aspects, the mask may be defined based at least in part on a reference time frame. For example, the mask may be applied in time windows that are defined relative to a frame timing of the UE 120 and/or the like.

In some aspects, the UE 120 may receive the information identifying the mask based at least in part on a request. For example, the UE 120 may transmit a request for the information identifying the mask (not shown in FIG. 5). The BS 110 may receive the request, and may provide the information identifying the mask in accordance with the request. For example, the BS 110 may accept the request and/or provide a confirmation regarding the request.

As indicated above, FIG. 5 is provided as an example. Other examples may differ from what is described with respect to FIG. 5.

Figure 6:
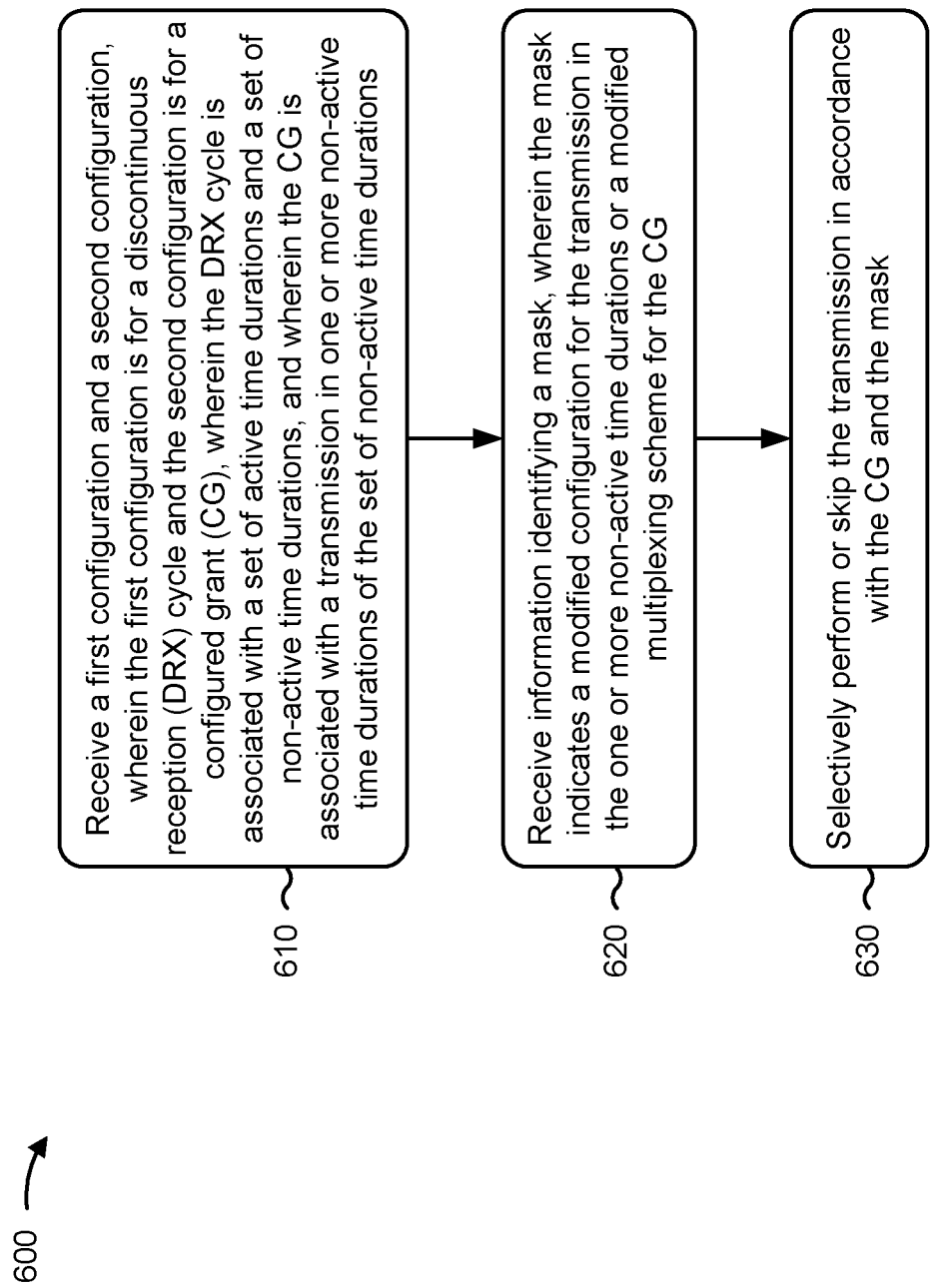
FIG. 6 is a diagram illustrating an example process performed, for example, by a user equipment, in accordance with the present disclosure.

FIG. 6 is a diagram illustrating an example process 600 performed, for example, by a UE, in accordance with the present disclosure. Example process 600 is an example where the UE (e.g., UE 120 and/or the like) performs operations associated with mask-based configuration for discontinuous reception.

As shown in FIG. 6, in some aspects, process 600 may include receiving a first configuration and a second configuration, wherein the first configuration is for a DRX cycle and the second configuration is for a CG, wherein the DRX cycle is associated with a set of active time durations and a set of non-active time durations, and wherein the CG is associated with a transmission in one or more non-active time durations of the set of non-active time durations (block 610). For example, the UE (e.g., using antenna 252, DEMOD 254, MIMO detector 256, receive processor 258, controller/processor 280, and/or the like) may receive a first configuration and a second configuration, as described above. In some aspects, the first configuration is for a DRX cycle and the second configuration is for a CG. In some aspects, the DRX cycle is associated with a set of active time durations and a set of non-active time durations. In some aspects, the CG is associated with a transmission in one or more non-active time durations of the set of non-active time durations.

As further shown in FIG. 6, in some aspects, process 600 may include receiving information identifying a mask, wherein the mask indicates a modified configuration for the transmission in the one or more non-active time durations or a modified multiplexing scheme for the CG (block 620). For example, the UE (e.g., using antenna 252, DEMOD 254, MIMO detector 256, receive processor 258, controller/processor 280, and/or the like) may receive information identifying a mask, as described above. In some aspects, the mask indicates a modified configuration for the transmission in the one or more non-active time durations or a modified multiplexing scheme for the CG.

As further shown in FIG. 6, in some aspects, process 600 may include selectively performing or skipping the transmission in accordance with the CG and the mask (block 630). For example, the UE (e.g., using antenna 252, DEMOD 254, MIMO detector 256, receive processor 258, controller/processor 280, and/or the like) may selectively perform or skip the transmission in accordance with the CG and the mask, as described above.

Process 600 may include additional aspects, such as any single aspect or any combination of aspects described below and/or in connection with one or more other processes described elsewhere herein.

In a first aspect, the mask indicates that the transmission associated with the CG is disallowed in the set of non-active time durations, and skipping the transmission is based at least in part on the mask.

In a second aspect, alone or in combination with the first aspect, the mask indicates that measurement information can be multiplexed on an empty transmission associated with the CG, and selectively receiving or skipping reception of the transmission comprises receiving the measurement information multiplexed on a CG resource of the CG in accordance with the mask.

In a third aspect, alone or in combination with one or more of the first and second aspects, process 600 includes receiving information activating or deactivating the mask, wherein selectively performing or skipping the transmission in accordance with the CG and the mask is based at least in part on the information activating or deactivating the mask.

In a fourth aspect, alone or in combination with one or more of the first through third aspects, at least one of the information identifying the mask or the information activating or deactivating the mask is received via at least one of: downlink control information, radio resource control signaling, or medium access control signaling.

In a fifth aspect, alone or in combination with one or more of the first through fourth aspects, process 600 includes transmitting a request for the information identifying the mask, wherein the information identifying the mask is received based at least in part on the request.

In a sixth aspect, alone or in combination with one or more of the first through fifth aspects, the mask is associated with a pattern that is defined relative to the DRX cycle.

In a seventh aspect, alone or in combination with one or more of the first through sixth aspects, the pattern indicates that the modified configuration or the modified multiplexing scheme does not apply in one or more DRX cycles (e.g., the modified configuration or the modified multiplexing scheme may apply in every Nth DRX cycle).

In an eighth aspect, alone or in combination with one or more of the first through seventh aspects, the mask is configured to apply for a quantity of DRX cycles (e.g., M DRX cycles).

In a ninth aspect, alone or in combination with one or more of the first through eighth aspects, the information identifying the mask is received with at least one of the first configuration or the second configuration.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
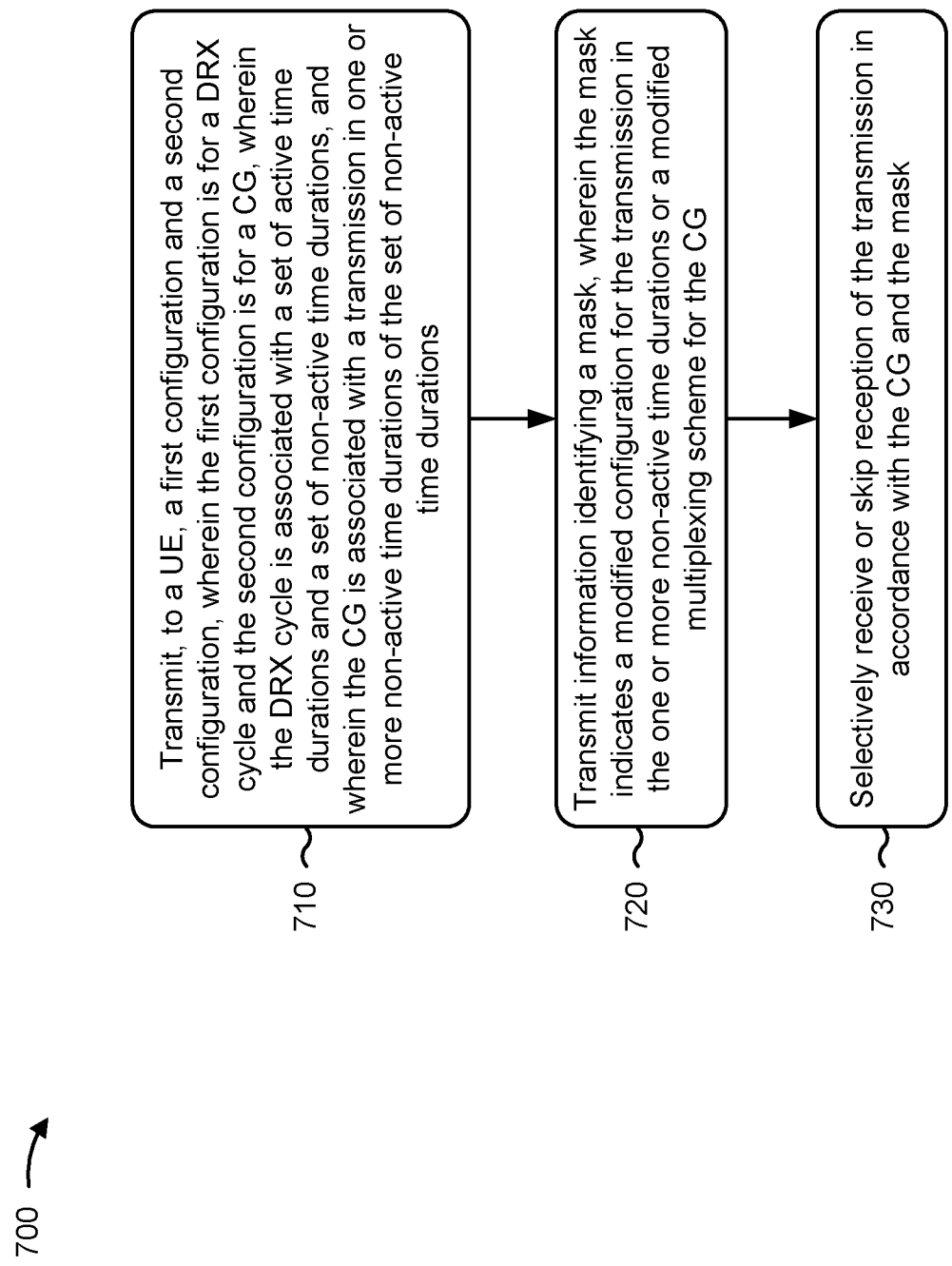
FIG. 7 is a diagram illustrating an example process performed, for example, by a base station, in accordance with the present disclosure.

FIG. 7 is a diagram illustrating an example process 700 performed, for example, by a base station, in accordance with the present disclosure. Example process 700 is an example where the base station (e.g., base station 110 and/or the like) performs operations associated with mask-based configuration for discontinuous reception.

As shown in FIG. 7, in some aspects, process 700 may include transmitting, to a UE, a first configuration and a second configuration, wherein the first configuration is for a DRX cycle and the second configuration is for a CG, wherein the DRX cycle is associated with a set of active time durations and a set of non-active time durations, and wherein the CG is associated with a transmission in one or more non-active time durations of the set of non-active time durations (block 710). For example, the base station (e.g., using controller/processor 240, transmit processor 220, TX MIMO processor 230, MOD 232, antenna 234, and/or the like) may transmit, to a UE, a first configuration and a second configuration, as described above. In some aspects, the first configuration is for a DRX cycle and the second configuration is for a CG. In some aspects, the DRX cycle is associated with a set of active time durations and a set of non-active time durations. In some aspects, the CG is associated with a transmission in one or more non-active time durations of the set of non-active time durations.

As further shown in FIG. 7, in some aspects, process 700 may include transmitting information identifying a mask, wherein the mask indicates a modified configuration for the transmission in the one or more non-active time durations or a modified multiplexing scheme for the CG (block 720). For example, the base station (e.g., using controller/processor 240, transmit processor 220, TX MIMO processor 230, MOD 232, antenna 234, and/or the like) may transmit information identifying a mask, as described above. In some aspects, the mask indicates a modified configuration for the transmission in the one or more non-active time durations or a modified multiplexing scheme for the CG.

As further shown in FIG. 7, in some aspects, process 700 may include selectively receiving or skipping reception of the transmission in accordance with the CG and the mask (block 730). For example, the base station (e.g., using antenna 234, DEMOD 232, MIMO detector 236, receive processor 238, controller/processor 240, and/or the like) may selectively receive or skip reception of the transmission in accordance with the CG and the mask, as described above.

Process 700 may include additional aspects, such as any single aspect or any combination of aspects described below and/or in connection with one or more other processes described elsewhere herein.

In a first aspect, the mask indicates that the transmission associated with the CG is disallowed in the set of non-active time durations, and wherein skipping the transmission is based at least in part on the mask.

In a second aspect, alone or in combination with the first aspect, the mask indicates that measurement information can be multiplexed on an empty transmission associated with the CG, and selectively receiving or skipping reception of the transmission comprises receiving the measurement information multiplexed on a CG resource of the CG in accordance with the mask.

In a third aspect, alone or in combination with one or more of the first and second aspects, process 700 includes transmitting information activating or deactivating the mask, wherein selectively receiving or skipping reception of the transmission in accordance with the CG and the mask is based at least in part on the information activating or deactivating the mask.

In a fourth aspect, alone or in combination with one or more of the first through third aspects, at least one of the information identifying the mask or the information activating or deactivating the mask is transmitted via at least one of: downlink control information, radio resource control signaling, or medium access control signaling.

In a fifth aspect, alone or in combination with one or more of the first through fourth aspects, process 700 includes receiving a request for the information identifying the mask, wherein the information identifying the mask is transmitted based at least in part on the request.

In a sixth aspect, alone or in combination with one or more of the first through fifth aspects, the mask is associated with a pattern that is defined relative to the DRX cycle.

In a seventh aspect, alone or in combination with one or more of the first through sixth aspects, the pattern indicates that the modified configuration or the modified multiplexing scheme does not apply in one or more DRX cycles.

In an eighth aspect, alone or in combination with one or more of the first through seventh aspects, the mask is configured to apply for a quantity of DRX cycles.

In a ninth aspect, alone or in combination with one or more of the first through eighth aspects, the information identifying the mask is transmitted with at least one of the first configuration or the second configuration.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

The following provides an overview of some Aspects of the present disclosure:

Aspect 1: A method of wireless communication performed by a user equipment (UE), comprising: receiving a first configuration and a second configuration, wherein the first configuration is for a discontinuous reception (DRX) cycle and the second configuration is for a configured grant (CG), wherein the DRX cycle is associated with a set of active time durations and a set of non-active time durations, and wherein the CG is associated with a transmission in one or more non-active time durations of the set of non-active time durations; receiving information identifying a mask, wherein the mask indicates a modified configuration for the transmission in the one or more non-active time durations or a modified multiplexing scheme for the CG; and selectively performing or skipping the transmission in accordance with the CG and the mask.

Aspect 2: The method of Aspect 1, wherein the mask indicates that the transmission associated with the CG is disallowed in the set of non-active time durations, and wherein skipping the transmission is based at least in part on the mask, and wherein skipping the transmission is based at least in part on the mask.

Aspect 3: The method of Aspect 1, wherein the mask indicates that measurement information can be multiplexed on an empty transmission associated with the CG, and wherein selectively transmitting the transmission comprises transmitting the measurement information multiplexed on a CG resource of the CG in accordance with the mask.

Aspect 4: The method of any of Aspects 1-3, further comprising: receiving information activating or deactivating the mask, wherein selectively performing or skipping the transmission in accordance with the CG and the mask is based at least in part on the information activating or deactivating the mask.

Aspect 5: The method of Aspect 4, wherein at least one of the information identifying the mask or the information activating or deactivating the mask is received via at least one of: downlink control information, radio resource control signaling, or medium access control signaling.

Aspect 6: The method of any of Aspects 1-5, further comprising: transmitting a request for the information identifying the mask, wherein the information identifying the mask is received based at least in part on the request.

Aspect 7: The method of any of Aspects 1-6, wherein the mask is associated with a pattern that is defined relative to the DRX cycle.

Aspect 8: The method of Aspect 7, wherein the pattern indicates that the modified configuration or the modified multiplexing scheme does not apply in one or more DRX cycles.

Aspect 9: The method of any of Aspects 1-8, wherein the mask is configured to apply for a quantity of DRX cycles.

Aspect 10: The method of any of Aspects 1-9, wherein the information identifying the mask is received with at least one of the first configuration or the second configuration.

Aspect 11: A method of wireless communication performed by a base station, comprising: transmitting, to a user equipment (UE), a first configuration and a second configuration, wherein the first configuration is for a discontinuous reception (DRX) cycle and the second configuration is for a configured grant (CG), wherein the DRX cycle is associated with a set of active time durations and a set of non-active time durations, and wherein the CG is associated with a transmission in one or more non-active time durations of the set of non-active time durations; transmitting information identifying a mask, wherein the mask indicates a modified configuration for the transmission in the one or more non-active time durations or a modified multiplexing scheme for the CG; and selectively receiving or skipping reception of the transmission in accordance with the CG and the mask.

Aspect 12: The method of Aspect 11, wherein the mask indicates that the transmission associated with the CG is disallowed in the set of non-active time durations, and wherein skipping the transmission is based at least in part on the mask, and wherein skipping reception of the transmission is based at least in part on the mask.

Aspect 13: The method of Aspect 11, wherein the mask indicates that measurement information can be multiplexed on an empty transmission associated with the CG, and wherein selectively receiving or skipping reception of the transmission comprises receiving the measurement information multiplexed on a CG resource of the CG in accordance with the mask.

Aspect 14: The method of any of Aspects 11-13, further comprising: transmitting information activating or deactivating the mask, wherein selectively receiving or skipping reception of the transmission in accordance with the CG and the mask is based at least in part on activating or deactivating the mask.

Aspect 15: The method of Aspect 14, wherein at least one of the information identifying the mask or the information activating or deactivating the mask is transmitted via at least one of: downlink control information, radio resource control signaling, or medium access control signaling.

Aspect 16: The method of any of Aspects 11-15, further comprising: receiving a request for the information identifying the mask, wherein the information identifying the mask is transmitted based at least in part on the request.

Aspect 17: The method of any of Aspects 11-16, wherein the mask is associated with a pattern that is defined relative to the DRX cycle.

Aspect 18: The method of Aspect 17, wherein the pattern indicates that the modified configuration or the modified multiplexing scheme does not apply in one or more DRX cycles.

Aspect 19: The method of any of Aspects 11-18, wherein the mask is configured to apply for a quantity of DRX cycles.

Aspect 20: The method of any of Aspects 11-19, wherein the information identifying the mask is transmitted with at least one of the first configuration or the second configuration.

Aspect 21: An apparatus for wireless communication at a device, comprising a processor; memory coupled with the processor; and instructions stored in the memory and executable by the processor to cause the apparatus to perform the method of one or more Aspects of Aspects 1-20.

Aspect 22: A device for wireless communication, comprising a memory and one or more processors coupled to the memory, the memory and the one or more processors configured to perform the method of one or more Aspects of Aspects 1-20.

Aspect 23: An apparatus for wireless communication, comprising at least one means for performing the method of one or more Aspects of Aspects 1-20.

Aspect 24: A non-transitory computer-readable medium storing code for wireless communication, the code comprising instructions executable by a processor to perform the method of one or more Aspects of Aspects 1-20.

Aspect 25: A non-transitory computer-readable medium storing a set of instructions for wireless communication, the set of instructions comprising one or more instructions that, when executed by one or more processors of a device, cause the device to perform the method of one or more Aspects of Aspects 1-20.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   receiving a first configuration and a second configuration, wherein the first configuration is for a discontinuous reception (DRX) cycle and the second configuration is for a configured grant (CG),
   wherein the DRX cycle is associated with a set of active time durations and a set of non-active time durations, and
   wherein the CG is associated with a transmission in one or more non-active time durations of the set of non-active time durations;
   receiving information identifying a mask, wherein the mask indicates a modified configuration for the transmission in the one or more non-active time durations or a modified multiplexing scheme for the CG; and
   selectively performing or skipping the transmission in accordance with the CG and the mask.

2. The method of claim 1, wherein the mask indicates that the transmission associated with the CG is disallowed in the set of non-active time durations, and wherein skipping the transmission is based at least in part on the mask, and wherein skipping the transmission is based at least in part on the mask.

3. The method of claim 1, wherein the mask indicates that measurement information can be multiplexed on an empty transmission associated with the CG, and wherein selectively transmitting the transmission comprises transmitting the measurement information multiplexed on a CG resource of the CG in accordance with the mask.

4. The method of claim 1, further comprising:
   receiving information activating or deactivating the mask, wherein selectively performing or skipping the transmission in accordance with the CG and the mask is based at least in part on the information activating or deactivating the mask.

5. The method of claim 4, wherein at least one of the information identifying the mask or the information activating or deactivating the mask is received via at least one of:
   downlink control information,
   radio resource control signaling, or
   medium access control signaling.

6. The method of claim 1, further comprising:
   transmitting a request for the information identifying the mask, wherein the information identifying the mask is received based at least in part on the request.

7. The method of claim 1, wherein the mask is associated with a pattern that is defined relative to the DRX cycle.

8. The method of claim 7, wherein the pattern indicates that the modified configuration or the modified multiplexing scheme does not apply in one or more DRX cycles.

9. The method of claim 1, wherein the mask is configured to apply for a quantity of DRX cycles.

10. The method of claim 1, wherein the information identifying the mask is received with at least one of the first configuration or the second configuration.

11. A method of wireless communication performed by a base station, comprising:
    transmitting, to a user equipment (UE), a first configuration and a second configuration, wherein the first configuration is for a discontinuous reception (DRX) cycle and the second configuration is for a configured grant (CG),
    wherein the DRX cycle is associated with a set of active time durations and a set of non-active time durations, and
    wherein the CG is associated with a transmission in one or more non-active time durations of the set of non-active time durations;
    transmitting information identifying a mask, wherein the mask indicates a modified configuration for the transmission in the one or more non-active time durations or a modified multiplexing scheme for the CG; and selectively receiving or skipping reception of the transmission in accordance with the CG and the mask.

12. The method of claim 11, wherein the mask indicates that the transmission associated with the CG is disallowed in the set of non-active time durations, and wherein skipping reception of the transmission is based at least in part on the mask.

13. The method of claim 11, wherein the mask indicates that measurement information can be multiplexed on an empty transmission associated with the CG, and wherein selectively receiving or skipping reception of the transmission comprises receiving the measurement information multiplexed on a CG resource of the CG in accordance with the mask.

14. The method of claim 11, further comprising:
transmitting information activating or deactivating the mask, wherein selectively receiving or skipping reception of the transmission in accordance with the CG and the mask is based at least in part on activating or deactivating the mask.

15. The method of claim 14, wherein at least one of the information identifying the mask or the information activating or deactivating the mask is transmitted via at least one of:
downlink control information,
radio resource control signaling, or
medium access control signaling.

16. The method of claim 11, further comprising:
receiving a request for the information identifying the mask, wherein the information identifying the mask is transmitted based at least in part on the request.

17. The method of claim 11, wherein the mask is associated with a pattern that is defined relative to the DRX cycle.

18. The method of claim 17, wherein the pattern indicates that the modified configuration or the modified multiplexing scheme does not apply in one or more DRX cycles.

19. The method of claim 11, wherein the mask is configured to apply for a quantity of DRX cycles.

20. The method of claim 11, wherein the information identifying the mask is transmitted with at least one of the first configuration or the second configuration.

21. A user equipment (UE) for wireless communication, comprising:
a memory; and
one or more processors operatively coupled to the memory, the memory and the one or more processors configured to:
receive a first configuration and a second configuration, wherein the first configuration is for a discontinuous reception (DRX) cycle and the second configuration is for a configured grant (CG),
wherein the DRX cycle is associated with a set of active time durations and a set of non-active time durations, and
wherein the CG is associated with a transmission in one or more non-active time durations of the set of non-active time durations;
receive information identifying a mask, wherein the mask indicates a modified configuration for the transmission in the one or more non-active time durations or a modified multiplexing scheme for the CG; and
selectively perform or skip the transmission in accordance with the CG and the mask.

22. The UE of claim 21, wherein the mask indicates that the transmission associated with the CG is disallowed in the set of non-active time durations, and wherein skipping the transmission is based at least in part on the mask, and wherein skipping the transmission is based at least in part on the mask.

23. The UE of claim 21, wherein the mask indicates that measurement information can be multiplexed on an empty transmission associated with the CG, and wherein the one or more processors, when selectively transmitting the transmission, are configured to transmitting the measurement information multiplexed on a CG resource of the CG in accordance with the mask.

24. The UE of claim 21, wherein the one or more processors are configured to:
receive information activating or deactivating the mask, wherein selectively performing or skipping the transmission in accordance with the CG and the mask is based at least in part on the information activating or deactivating the mask.

25. The UE of claim 21, wherein the one or more processors are configured to:
transmit a request for the information identifying the mask, wherein the information identifying the mask is received based at least in part on the request.

26. A base station (BS) for wireless communication, comprising:
a memory; and
one or more processors operatively coupled to the memory, the memory and the one or more processors configured to:
transmit, to a user equipment (UE), a first configuration and a second configuration, wherein the first configuration is for a discontinuous reception (DRX) cycle and the second configuration is for a configured grant (CG),
wherein the DRX cycle is associated with a set of active time durations and a set of non-active time durations, and
wherein the CG is associated with a transmission in one or more non-active time durations of the set of non-active time durations;
transmit information identifying a mask, wherein the mask indicates a modified configuration for the transmission in the one or more non-active time durations or a modified multiplexing scheme for the CG; and
selectively receive or skip reception of the transmission in accordance with the CG and the mask.

27. The base station of claim 26, wherein the mask indicates that the transmission associated with the CG is disallowed in the set of non-active time durations, and wherein skipping reception of the transmission is based at least in part on the mask.

28. The base station of claim 26, wherein the mask indicates that measurement information can be multiplexed on an empty transmission associated with the CG, and wherein the one or more processors, when selectively receiving or skipping reception of the transmission, are configured to receive the measurement information multiplexed on a CG resource of the CG in accordance with the mask.

29. The base station of claim 26, wherein the one or more processors are configured to:
transmit information activating or deactivating the mask, wherein selectively receiving or skipping reception of the transmission in accordance with the CG and the mask is based at least in part on activating or deactivating the mask.

30. The base station of claim 26, wherein the one or more processors are configured to:
   receive a request for the information identifying the mask, wherein the information identifying the mask is transmitted based at least in part on the request.

\* \* \* \* \*